Oct. 29, 1929.    R. E. LANDES    1,733,807
SANITARY MILK BOTTLE COVER
Filed Dec. 27, 1927

INVENTOR
Ruth E. Landes
BY
ATTORNEY

Patented Oct. 29, 1929

1,733,807

UNITED STATES PATENT OFFICE

RUTH E. LANDES, OF NEW YORK, N. Y.

SANITARY MILK-BOTTLE COVER

Application filed December 27, 1927. Serial No. 242,912.

This invention relates in particular to a milk bottle cover adapted for the purpose of providing a cover which may be held in a closed or open position, as a means of preventing foreign matter from contaminating the milk in the bottle and so as to permit the milk contained therein to be poured therefrom when desired.

The object of the invention is to provide a milk bottle cover of novel construction and arrangement of parts hereinafter more fully described, claimed and illustrated in the accompanying drawing.

Figure 1:
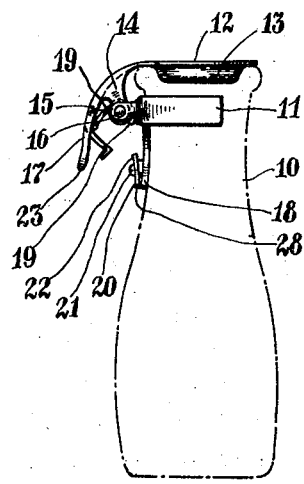
Fig. 1 is a side elevational view of my improved device applied to a milk bottle.
Figure 2:
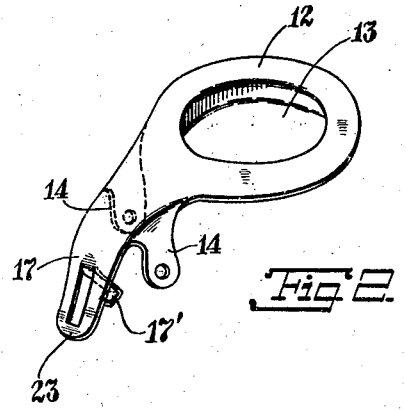
Fig. 2 is a perspective detail view of the cover proper.
Figure 3:
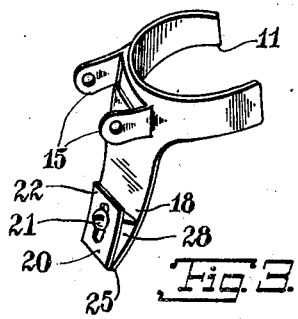
Fig. 3 is a similar view of the clamping member.

The reference numeral 10 indicates a milk bottle of customary construction and the neck thereof is engaged by the clamping member 11, preferably of spring steel construction, suitably formed or bent so as to be engaged thereon. The cover proper 12 is adapted to enclose or cover the top or open end of the said milk bottle, and is provided with an integral turned-in portion 13, adapted to engage somewhat in the open end of the said milk bottle, and is provided with a pair of parallel ears 14. The clamping member 11, is provided with a similar pair of parallel ears 15. The pin 16 engages through the ears 14 and 15, and has its extremities riveted over, or suitably enlarged, as a means of holding the said pin in place therein.

The cover proper 12 is provided with an extended portion 17, or handle element having a bent portion 17'. The pin 16 is provided with a coil spring 19, which is secured at one extremity to the ear 15 and the other end abuts against the extended portion 17. The above described construction is such as will permit the spring 19, to normally hold the cover proper 12 in a closed position as clearly shown in Fig. 1.

Figure 4:
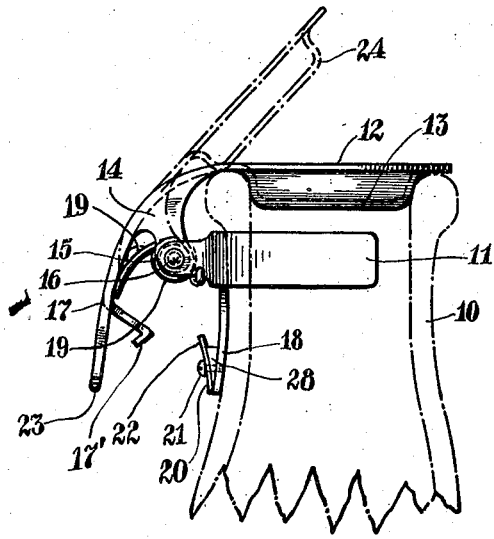
Fig. 4 is an enlarged fragmentary side elevational view of the device shown in Fig. 1 illustrating by dotted lines the open position thereof.

The clip 20 is secured as at 21, by a bolt or the like, to the free extremity of the extended element 18. The clip 20 is formed or bent upwardly as at 22, and is adapted to engage the free bent portion 17' of the handle element 17, as a means of holding the cover proper 12, in an open position, as designated by the reference numeral 24, in Fig. 4. The clip 20 has formed therein an elongated aperture 25, adapted to receive the said bolt 21, as a means of positioning the clip, so as to insure the proper engagement of the bent portion 23 of the cover proper 12, for the purpose as above set forth.

The wedge member 28 is secured by means of the rivet 21, to the extended element 18, below the said clip 22, as a means of positioning the clip 22, so as to increase or decrease the opening intermediate the clip 22 and the extended element 18, which will permit the bent portion 23 of the handle element 17 to readily engage therein, as above set forth.

Figure 5:
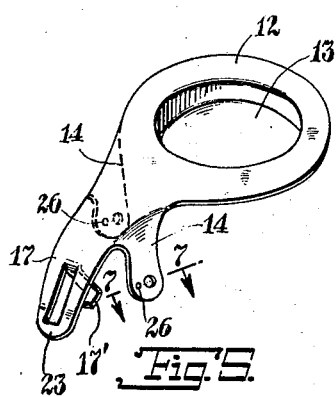
Fig. 5 is a perspective detail view illustrating further development of the cover proper.
Figure 6:
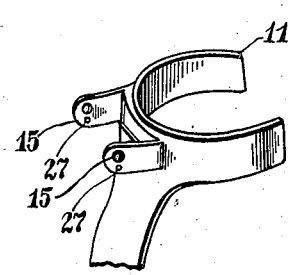
Fig. 6 is a perspective detail view illustrating a further development of the clamping member.
Figure 7:
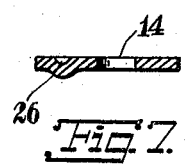
Fig. 7 is a fragmentary sectional view taken on the line 7—7 of Fig. 5.

In Figs. 5, 6 and 7, of the accompanying drawing, I have shown one of the above mentioned ears provided with a raised portion 26, formed therein, by punching or extending a portion of the ear 14, and adapted to engage in the aperture 27, formed in one of the ears. The above described construction is such as will hold the cover proper 12, in a semi or partially open position.

While I have shown and described a preferred embodiment of my invention, it is to be understood that I do not limit myself to the precise construction herein disclosed and the right is reserved to all changes and modification coming within the scope of the invention as defined in the appended claims.

Having thus described my invention what I claim as new and desire to protect by Letters Patent of the United States is as follows:

1. In a milk bottle cover, a clamping member comprising spaced ears and a downwardly disposed extension, a handle member comprising spaced apart ears pivotally connected with the spaced apart ear of said clamping member, a cover proper on said handle member, a spring secured at one extremity to an ear of said clamping member and engaged against said handle for normally urging said cover proper to closed position, a catch on the lower end portion of the extension of said clamping member, a cut out inwardly disposed clip integral with said handle member comprising an end flange engageable with said catch for holding said cover proper fully open, and projections on the ears of said clamping member engageable in depression in the ears of the said handle member for retaining said cover in partially open position.

2. In a milk bottle cover, a clamping member with a downwardly disposed extension, a handle member pivotally mounted on the clamping member and provided with a projecting clip, a wedge on the lower extremity of said extension, and a plate adjustably secured on the wedge for assuming positions with the top of the plate at different distances from the extension for the proper accommodation of the clip.

In testimony whereof I have affixed my signature.

RUTH E. LANDES.